United States Patent [19]

Okuzono et al.

[11] Patent Number: 4,713,083

[45] Date of Patent: Dec. 15, 1987

[54] ALCOHOLIC SOLUTION OF SULPHONIC ACID-CONTAINING COPOLYMER DYED WITH BASIC DYE

[75] Inventors: Shuichi Okuzono, Shinnanyo; Tetsuo Tanaka, Hofu; Yasuhiro Oda, Tokuyama; Takashi Shintani, Tokuyama; Noriaki Emura, Tokuyama, all of Japan

[73] Assignee: Toyo Soda Manufacturing Co., Ltd., Shinnanyo, Japan

[21] Appl. No.: 751,595

[22] Filed: Jul. 3, 1985

[30] Foreign Application Priority Data

Jul. 6, 1984 [JP] Japan ................... 59-138971

[51] Int. Cl.$^4$ .............. C09B 67/34; C09B 69/10; C09D 11/10; C08F 2/44
[52] U.S. Cl. .......................... 8/557; 8/654; 8/657; 8/402; 8/919; 106/22; 260/DIG. 38
[58] Field of Search .................. 106/20, 22; 260/DIG. 38; 8/654, 655, 657, 659, 557

[56] References Cited

U.S. PATENT DOCUMENTS

| | | | |
|---|---|---|---|
| 1,920,324 | 8/1933 | Schmidt | 106/220 |
| 4,042,545 | 8/1977 | Defago et al. | 260/DIG. 38 |
| 4,270,916 | 6/1981 | Racciato | 8/527 |
| 4,554,018 | 11/1985 | Allen | 260/DIG. 38 |
| 4,567,213 | 1/1986 | Bhatia et al. | 106/22 |
| 4,592,756 | 6/1986 | Kawasaki et al. | 106/22 |
| 4,612,343 | 9/1986 | Okuzono et al. | 524/547 |

FOREIGN PATENT DOCUMENTS

| | | |
|---|---|---|
| 53-123208 | 10/1978 | Japan . |
| 54-037539 | 11/1979 | Japan . |
| 59-041369 | 3/1984 | Japan . |

*Primary Examiner*—A. Lionel Clingman
*Attorney, Agent, or Firm*—Cushman, Darby & Cushman

[57] ABSTRACT

A coloring material comprising a solution of an alcohol-soluble resin having a sulfonic acid group or a salt thereof, which is dyed with a basic dye, in a solvent comprising an alcohol as a main component. The coloring material is prepared either by (a) polymerizing an ethylenically unsaturated sulfonic acid or a salt thereof in water and adding a basic dye to the obtained aqueous liquid of the formed polymer or (b) carrying out said polymerization in the presence of a basic dye, and dissolving (i) the obtained aqueous liquid of the formed colored polymer of (ii) a colored polymer obtained by removing water from the obtained aqueous liquid of the formed colored polymer in a solvent comprising an alcohol as a main component; or, (a') carrying out said polymerization in a solvent comprising an alcohol as a main component and then adding a basic dye to the obtained polymer solution, or (b') carrying out said polymerization in the presence of a basic dye.

8 Claims, No Drawings

ALCOHOLIC SOLUTION OF SULPHONIC ACID-CONTAINING COPOLYMER DYED WITH BASIC DYE

BACKGROUND OF THE INVENTION

1. Field of the Invention

The present invention relates to a coloring material comprising an alcohol as a main solvent component and a process for the preparation thereof.

This coloring material comprising an alcohol as a main solvent component is very valuable as a coloring material, paint or ink for wooden articles, paper and fibers

2. Description of the Related Art

As a coloring material comprising an alcohol as a main solvent component and a dye as a colorant, there are known compositions comprising a dye, an alcohol-soluble resin and an alcohol, as disclosed in Japanese Examined Patent Publication No. 54-37539 and No. 57-1555 and Japanese Unexamined Patent Publication No. 59-41369. In these known coloring materials comprising an alcohol as a main component, as the alcohol-soluble resin, there are used shellac, a maleic acid resin, polyvinylpyrrolidone, a phenolic resin, a ketone resin and polyvinyl butyral. These resins, however, act only as the binder, and dyes are merely dispersed in these binder resins. Accordingly, the following problem arises in known coloring materials of this type.

Namely, when a basic dye is used as the colorant, though the basic dye is excellent in the color abundance and color sharpness over other dyes, the light fastness is poor and the coloring material comprising the basic dye has poor light resistance.

SUMMARY OF THE INVENTION

It is a primary object of the present invention to provide a coloring material comprising a basic dye as a colorant and an alcohol as a main solvent, with improved light resistance.

In one aspect of the present invention, there is provided a coloring material comprising a solution of an alcohol-soluble resin having a sulfonic acid group or a salt thereof, which is dyed with a basic dye, in a solvent comprising an alcohol as a main component.

In another aspect of the present invention, there is provided a process for the preparation of coloring materials, which comprises the steps of:

($a_1$) polymerizing an ethylenically unsaturated sulfonic acid or a salt thereof or a mixture of an ethylenically unsaturated sulfonic acid or salt thereof and a copolymerizable monomer in water and then adding a basic dye to the thus-obtained aqueous liquid of the formed polymer or ($a_2$) carrying out said polymerization in the presence of a basic dye, and then (b) either dissolving (i) the thus-obtained aqueous liquid of the formed colored polymer or (ii) a colored polymer obtained by removing water from the thus-obtained aqueous liquid of the formed colored polymer in a solvent comprising an alcohol as a main component.

In still another aspect of the present invention, there is provided a process for the preparation of coloring materials, which comprises the steps of:

($a_1$) polymerizing a mixture of an ethylenically unsaturated sulfonic acid or salt thereof and a copolymerizable monomer in a solvent comprising an alcohol as a main component and then adding a basic dye to the obtained polymer solution, or ($a_2$) carrying out said polymerization in the presence of a basic dye.

The alcohol-soluble resin in the coloring material of the present invention acts not only as a binder but also as a part of a colorant.

Therefore, the coloring material exhibits improved light resistance while effectively utilizing the characteristics of the basic dye such as color abundance and color sharpness.

DESCRIPTION OF THE PREFERRED EMBODIMENTS

An alcohol-soluble resin having a sulfonic acid group or a salt thereof, which is used in the present invention, may be prepared according to various processes. For example, there may be adopted a process in which a known resin is sulfonated to obtain an alcohol-soluble resin and process in which an ethylenically unsaturated sulfonic acid or a salt thereof is copolymerized with a comonomer capable of providing an alcohol-soluble resin.

Copolymerization of an ethylenically unsaturated sulfonic acid or a salt thereof will now be described.

As the ethylenically unsaturated sulfonic acid or its salt that is used for the production of the colored polymer of the present invention, there can be mentioned unsaturated sulfonic acids such as styrene-sulfonic acid, vinylbenzyl-sulfonic acid, vinyl-sulfonic acid, allyl-sulfonic acid, methally-sulfonic acid, acryloyloxy- ethyl-sulfonic acid, methacryloyloxypropyl-sulfonic acid and 2-acrylamido-2-methyl-propane-sulfonic acid, and salts of these unsaturated sulfonic acids such as lithium, sodium, potassium and ammonium salts.

As the copolymerizable monomer capable of providing an alcohol-soluble resin, there can be mentioned hydroxyethyl acrylate, hydroxyethyl methacrylate, hydroxypropyl acrylate, hydroxypropyl methacrylate, polyethylene glycol monomethacrylate, ethyl acrylate, ethyl methacrylate, propyl acrylate, propyl methacrylate, butyl acrylate and butyl methacrylate.

It is preferable in the present invention that at least one member selected from the above-mentioned ethylenically unsaturated sulfonic acids and salts be copolymerized with at least one member selected from the above-mentioned copolymerizable monomers. The mixing ratio may be voluntarily selected. However, if the proportion of the ethylenically unsaturated sulfonic acid or its salt is too high, the solubility in an alcohol is reduced. Accordingly, in order to obtain a coloring material having a dense color, it is preferred that the mixing ratio of the ethylenically unsaturated sulfonic acid or its salt be 0.1% to 60% by weight, more preferably 0.1% to 40% by weight. Furthermore, other comonomers copolymerizable with the ethylenically unsaturaed sulfonic acid or its salt and the above-mentioned comonomer may be copolymerized to impart to the copolymer softness, rigidity, adherence or cross-linkability. Such comonomers may be used in an amount of preferably up to 40% by weight based on the monomer other than the ethylenically unsaturated sulfonic acid or its salt, so far as the alcohol solubility of the formed polymer is not degraded.

As such comonomers, there can be mentioned monoethylenically unsaturated monomers, for example, acrylic acid esters such as methyl acrylate, 2-ethylhexyl acrylate, n-hexyl acrylate, cyclohexyl acrylate, n-octyl acrylate, dodecyl acrylate, tetradecyl acrylate, glycidyl acrylate, aminoethyl acrylate and diethylaminoethyl acrylate; methacrylic acid esters such as methyl methacrylate, n-hexyl methacrylate, cyclohexyl methacrylate, n-octyl methacrylate, 2-ethylhexyl methacrylate, dodecyl methacrylate, tetradecyl methacrylate, glycidyl methacrylate, aminoethyl methacrylate and diethylaminoethyl methacrylate; vinyl esters such a vinyl acetate, vinyl propionate and vinyl benzoate; ethylenically unsaturated acids and their anhydrides such as acrylic acid, methacrylic acid, maleic acid, maleic acid anhydride, fumaric acid and itaconic acid; acrylic and methacrylic amides and their derivatives such as acrylamide, methacrylamide, N-methylolacrylamide, N-n-butoxymethylacrylamide and N-methoxymethylacrylamide; styrene and 3,4-dichlorobutene; and diene monomers such as butadiene, chloroprene and 2,3-dichlorobutadiene.

The polymer of the present invention can be obtained by polymerizing the foregoing monomers in water or a solvent comprising an alcohol as a main component in the presence or absence of a basic dye, if necessary in the presence of a surface active agent, a dispersant or the like, by feeding these components collectively, separately or continuously together with an ordinary radical polymerization initiator, for example, a persulfate such as potassium persulfate or ammonium persulfate or an organic peroxide such as cumene hydroperoxide or t-butyl hydroperoxide to a polymerization vessel under agitation.

The polymerization may be carried out at a temperature lower than the boiling point of the medium. The molecular weight of the the polymer obtained according to this polymerization process depends on the concentrations of the monomers present in the polymerization system, the amount of the radical polymerization initiator used and the polymerization temperature. The monomer concentration may be freely selected, but the monomer concentration is generally 3% to 50% and preferably 10% to 30%. Polymerization at a high monomer concentration results in increase of the viscosity of the polymerization system and removal of the polymerization heat becomes difficult. Accordingly, too high a monomer concentration is not preferred. Furthermore, too low a monomer concentration is not preferred from an economical viewpoint.

As is apparent from the object of the present invention, the process for the preparation of the polymer is not limited in the present invention. In the case where polymerization is carried out in water in the absence of a basic dye, the polymer obtained by polymerization is dyed with a basic dye. As the basic dye (the term "basic dye" is used in a broad sense in the instant specification so that even a cationic dye is included), there can be mentioned a triphenylmethane dye, an azo dye, a methine dye, an oxazine dye and an anthraquinone dye. Dyeing can be accomplished by an ordinary method.

For example, there may be adopted a method in which the pH value of an aqueous liquid of the polymer is adjusted to 2 to 7, preferably 3 to 5, by an organic acid such as formic acid, acetic acid, buytric acid, tartaric acid or malic acid, an inorganic acid such as hydrochloric acid or sulfuric acid or an aqueous solution of sodium hydroxide or sodium carbonate, and then an aqueous solution of a basic dye is added to the aqueous liquid of the polymer. Subsequently, the resulting solution is dissolved in an alcohol, or water is removed from the resulting solution by spray drying, drying under reduced pressure or other ordinary drying, washing and drying are performed according to need and then the dyed polymer is dissolved in a solvent comprising an alcohol as a main component, whereby the intended colored polymer solution is obtained. Alternatively, the colored polymer solution may be obtained by adding a solution of the above-mentioned dye in an alcohol to the aqueous liquid of the polymer. In the case where polymerization is carried out in a solvent comprising an alcohol as a main component, neutralization is carried out in the same manner as described above after polymerization and the above-mentioned dye is added. Incidentally, in this case, a colored polymer solution can be directly obtained by carrying out polymerization in the presence of the basic dye. In this case, in view of the stability of the dye against fading and discoloration, it is preferred that polymerization be carried out at a pH value of 2 to 7. At any rate, in the present invention, the conditions for dyeing the polymer with the basic dye are not particularly limited. The concentration of the thus-prepared colored polymer solution can be appropriately selected according to the intended use, but the concentration is ordinarily adjusted to 1% to 50% by weight, especially 3% to 30% by weight. Too high a concentration is not practically preferred because the viscosity of the solution is too high, and too low a concentration is not preferred from an economical viewpoint.

The solvent used for the preparation of the coloring material of the present invention is predominantly comprised of an alcohol, namely, comprises 50% to 100% by weight of an alcohol and 0% to 50% by weight of water or other organic solvent.

As the alcohol that is used in the present invention, there can be mentioned monohydric alcohols such as methyl alcohol, ethyl alcohol, n-propyl alcohol, isopropyl alcohol, n-butyl alcohol, sec-butyl alcohol, tert-butyl and isobutyl alcohol, polyhydric alcohols such as ethylene glycol, diethylene glycol, propylene glycol, butylene glycol, triethylene glycol and glycerol, and monoalkyl ethers of these polyhydric alcohols such as monomethyl ethers and monoethyl ethers.

Water may be contained in the coloring material in an amount not rendering drying difficult. For example, when the coloring material is used as an ink of an overhead projector sheet or the like, the coloring material may contain water in an amount of up to 20% by weight.

The organic solvent which may be used in combination with an alcohol includes, for example, a volatile organic solvent such as xylene, toluene, n-butyl acetate, ethyl cellosolve, methylethyl ketone or methylisobutyl ketone.

The coloring material of the present invention is useful as a coloring material, paint or ink for wooden articles, paper and fibers.

The present invention will now be described in detail with reference to the following examples that by no means limit the scope of the invention.

EXAMPLE 1

A polymerization vessel was charged with 40 g of ethyl acrylate, 2.1 g of 2-acrylamido-2-methylpropanesulfonic acid and 100 g of ethyl alcohol in a nitrogen current, and the temperature was elevated with stirring. When the temperature was elevated to 80° C., addition of a catalyst solution of 1 g of azoisobutyronitrile in 100 g of ethyl alcohol was started and dropwise addition was performed over a period of 3 hours to effect polymerization. Then, reaction was further conducted for 3 hours to obtain an ethanol solution having a polymer concentration of 16.4% by weight. Then, 3 g of an aqueous solution of sodium hydroxide having a concentration of 10% by weight was added to the reaction mixture. Then, 1.0 g of Cathilon Brilliant Red 4GH (cationic dye supplied by Hodogaya Chem. Co., Ltd.) was added, and the mixture was stirred at 70° C. for 1 hour to obtain a colored polymer solution according to the present invention.

Even if a film obtained by drying this colored polymer solution was washed with water, the film was kept colored in red. The polymer solution was coated on a writing paper sheet of JIS P 3201 by using a 1-mil doctor blade, and the light fastness fo the coating was tested by a xenone fade-ometer at a black panel temperature of 65° C.±3° C., and a relative humidity of 35° C.±5%. The discoloration degree was evaluated by using a blue scale of JIS L 0841. It was found that the light fastness of the dye per se was about class 1 of the blue scale but the light fastness of the colored polymer solution was class 3.

COMPARATIVE EXAMPLE 1

A colored polymer solution was prepared in the same manner as Example 1 except that the polymerization was carried out in the absence of 2-acrylamido-2-methylpropane-sulfonic acid. All other conditions remained substantially the same.

When a film obtained by drying this colored polymer solution was washed with water, the dye was washed away. The light fastness of the colored polymer solution was class 1.

EXAMPLE 2

A polymerization vessel was charged with 34 g of water in a nitrogen current, and the temperature was elevated to 90° C. A monomer solution comprising 117 g of 2-hydroxyethyl methacrylate, 20.6 g of 2-acrylamido-2-methylpropane-sulfonic acid and 467 g of water and a catalyst solution of 10.8 g of ammonium persulfate in 34 g of water were added dropwise over a period of 3 hours to effect polymerization. Subsequently, polymerization was further conducted for 2 hours at 90° C. to obtain an aqueous solution having a polymer concentration of 20.2% by weight.

The pH value of the thus-obtained aqueous polymer solution was adjusted to 5 by an aqueous solution of sodium hydroxide having a concentration of 10% by weight. An aqueous dye solution comprising 0.5 part of acetic acid, 10 parts of water and 0.5 part of Cathilon Blue 5GLH (cationic dye supplied by Hodogaya Chem. Co., Ltd.) was added to 50 parts of the polymer solution and then the mixture was stirred at 80° C. for 1 hour to effect dyeing. The obtained aqueous colored polymer solution was dried to obtain 10.3 g of a colored polymer. The colored polymer was dissolved in 40 g of ethyl alcohol to obtain a colored polymer solution having a polymer concentration of 20% by weight.

When the light resistance of the thus-obtained colored polymer solution was examined in the same manner as described in Example 1, it was found that the light fastness of the polymer solution was class 3—higher than the light fastness of the dye per se, which was class 1. When a felt pen was impregnated with the colored polymer solution and letters were written on a commercially available white board or overhead projector sheet by this felt pen, it was found that the written letters could be cleanly erased by rubbing with a wet cloth.

COMPARATIVE EXAMPLE 2

A polymerization vessel was charged with 30 g of ethyl alcohol in a nitrogen current, and the temperature was elevated to 80° C. A monomer solution of 50 g of 2-hydroxyethyl methacrylate in 70 g of ethyl alcohol and a catalyst solution of 2 g of azoisobutyronitrile in 100 g of ethyl alcohol were added dropwise over a period of 3 hours to effect polymerization. Subsequently, polymerization was further conducted for 2 hours at 80° C. to obtain an ethanol solution having a polymer concentration of 20.0% by weight. Then, Cathilon Blue 5GLH was added in the same manner as Example 2.

The light resistance of thus-obtained colored polymer solution was class 1. When letters were written on a commercially available white board or overhead projector sheet in the same manner as Example 2, it was found that the written letters could not be cleanly erased by rubbing with a wet cloth and a blue color was spread out.

EXAMPLE 3

A polymerization vessel was charged with 47.5 g of ethyl acrylate, 6.4 g of Spinomer NaSS (sodium p-styrene-sulfonate having a purity of 81.9% and supplied by Toyo Soda Mfg. Co., Ltd.), 160 g of ethyl alcohol and 20 g of water in a nitrogen current, and the temperature was elevated with stirring. When the temperature was elevated to 80° C., addition of a catalyst solution of 1 g of azoisobutyronitrile in 50 g of ethyl alcohol was started and drowise addition was performed over a period of 3 hours to effect polymerization. Then, the reaction was further conducted for 3 hours to obtain an ethanol solution having a polymer concentration of 18.2% by weight. To 100 of the thus formed solution was added 1.5 g of Cathilon Yellow 3GLH (cationic dye supplied by Hodogaya Chem. Co., Ltd.). The mixture was stirred at 70° C. for 1 hour to obtain a colored polymer solution according to the present invention.

EXAMPLE 4

A polymerization vessel was charged with 35 g of water in a nitrogen current, and the temperature was elevated to 90° C. A monomer solution comprising 104 g of 2-hydroxyethyl methacrylate, 40 g of Spinomer NaSS and 467 g of water and a catalyst solution of 10.8 g of ammonium persulfate in 34 g of water were added dropwise over a period of 3 hours to effect polymerization. Subsequently, polymerization was further conducted at 90° C. for 2 hours to obtain an aqueous solution having a polymer concentration of 20.0% by weight. To 10 g of this solution was gradually added a solution of 0.8 g of Cathilon Brilliant Red 4GH in 90 g of ethyl alcohol. Then, the mixture was stirred for 1 hour at 70° C. to obtain a colored polymer solution according to the present invention.

We claim:

1. A coloring material comprising a solution of an alcohol-soluble copolymer having a sulphonic acid group or a salt thereof, which is dyed with a basic dye, in a solvent comprising an alcohol as a main component;
    said copolymer being derived from (i) 0 1% to 40% by weight of at least one ethylenically unsaturated sulphonic acid or salt thereof selected from the group consisting of styrene-sulphonic acid, vinyl-benzyl-sulphonic acid, vinyl-sulphonic acid, allyl-sulphonic acid, methallyl-sulphonic acid, acryloyloxyethyl-sulphonic acid, acryloyloxyethyl-sulphonic acid, methacryloyloxypropyl-sulphonic acid an 2-acrylamido-2-methylpropane-sulphonic acid, and the lithium, sodium, potassium or ammonim salts of said unsaturated sulphonic acids, and (ii) 60 to 99.9% by weight of at least one copolymerizable monomer composed of, based on the weight of the copolymerizable monomer, 60% to 100% by weight of at least one monomer selected from the group consisting of hydoxyethyl acrylate, hydroxyethyl methacrylate, hydroxyporpyl acrylate, hydroxyethyl methacrylate, polyethylene glycol monomethacrylate, ethyl acrylate, ethyl methacrylate, porpyl acrylate, porpyl methacrylate, butyl acrylate and butyl methacrylate, and 0% to 40% by weight of other copolymerizable monomer; and the concentration of said alcohol-soluble copolymer in the solution being in the range of 1% to 50% by weight.

2. A process for the preparation of coloring materials, which comprises the steps of:
   (a₁) polymerizing a monomer mixture of an ethylenically unsaturated sulphonic acid or salt thereof and a copolymerizable monomer in water and then adding a basic dye to the thus-obtained aqueous liquid of the formed polymer, or
   (a₂) carrying out said polymerization in the presence of a basic dye, and then
   (b) either dissolving (i) the thus-obtained aqueous liquid of the formed colored polymer or (ii) a colored polymer obtained by removing water from the thus-obtained aqueous liquid of the formed colored polymer in a solvent comprising an alcohol as a main component;

said monomer mixture being composed of (i) 0.1% to 40% by weight of at least on ethylenically unsaturated sulphonic acid or a salt thereof selected from the group consisting of styrene-sulphonic acid, vinylbenzyl-sulphonic acid, vinyl-sulphonic acid, allyl-sulphonic acid, methallyl-sulphonic acid, acryloyloxyethyl-sulphonic acid, methacryloyloxypropoyl-sulphonic acid and 2-acrylamido-2-methyl-propane-sulphonic acid, and the lithium, sodium, potassium or ammonium salts of said unsaturated sulphonic acids, and (ii) 99.9% to 60% by weight of at least one copolymerizable monomer composed of, based on the weight of the copolymerizable monomer, 60% to 100% by weight of at least one monomer selected from the group consisting of hydroxyethyl acrylate, hydroxyethyl methacrylate, hydroxypropyl acrylate, hydroxypoopyl methacrylate, polyethylene glycol monomethacrylate, ethyl acrylate, ethyl methacrylate, propyl acrylate, propyl methacrylate, butyl acryalte and butyl methacrylate, and 0% to 40% by weight of other copolymerizable monomer.

3. A process for the preparation of coloring materials, which comprises the steps of:
   (a₁) polymerizing a monomer mixture of an ethylenically unsaturated sulphonic acid or salt thereof and a copolymerizable monomer in a solvent comprising an alcohol and a main component and then adding a basic dye to the obtained polymer solution, or
   (a₂) carrying out said polymerization in the presence of a basic dye;

said monomer mixture being composed of (i) 0.1% to 40% by weight of at least one ethylenically unsaturated sulphonic acid or salt thereof selected from the group consisting of styrene-sulphonic acid, vinylbenzyl-sulphonic acid, vinyl-sulphonic acid, allyl-sulphonic acid, methallyl-sulphonic acid, acryloyloxyethyl-sulphonic acid, methacryloyloxypropyl-sulphonic acid and 2-acrylamido-2-methyl-propane-sulphonic acid, and the lithium sodium, potassium or ammonium salts of said unsaturated sulphonic acids and (ii) 99.9% to 60% by weight of at least one copolymerizable monomer composed of, based on the weight of the copolymerizable monomer, 60% to 100% by weight of at least one monome selected from the group consisting of hydroxyethyl acrylate, hydroxyethyl methacrylate, polyethylene glycol monomethacrylate, ethyl acrylate, ethyl methacrylate, propyl acrylate, propyl methacrylate, butyl acrylate and butyl methacrylate, and 0% to 40% by weight of other copolymerizable monomer.

4. A coloring material according to claim 1, wherein the alcohol is at least one member selected from methyl alcohol, ethyl alcohol, n-propyl alcohol, iso-propyl alcohol, n-butyl alcohol, sec-butyl alcohol, tert-butyl alcohol, isobutyl alcohol, ethylene glycol, diethylene glycol, propylene glycol, glycerol, and monomethyl ethers and monoethyl ethers of said polyhydric alcohols.

5. A process according to claim 2, wherein, in the step of (a₁), a basic dye is added to the aqueous liquid of the formed polymer at a pH value of 2 to 7.

6. A process according to claim 2 wherein said polymerization (a₂) is carried out at a pH value of 2 to 7.

7. A process according to claim 3 wherein, in the step of (a₁), a basic dye is added to the polymer solution at a pH value of 2 to 7.

8. A process according to claim 3 wherein said polymerization (a₂) is carried out at a pH value of 2 to 7.

* * * * *